UNITED STATES PATENT OFFICE.

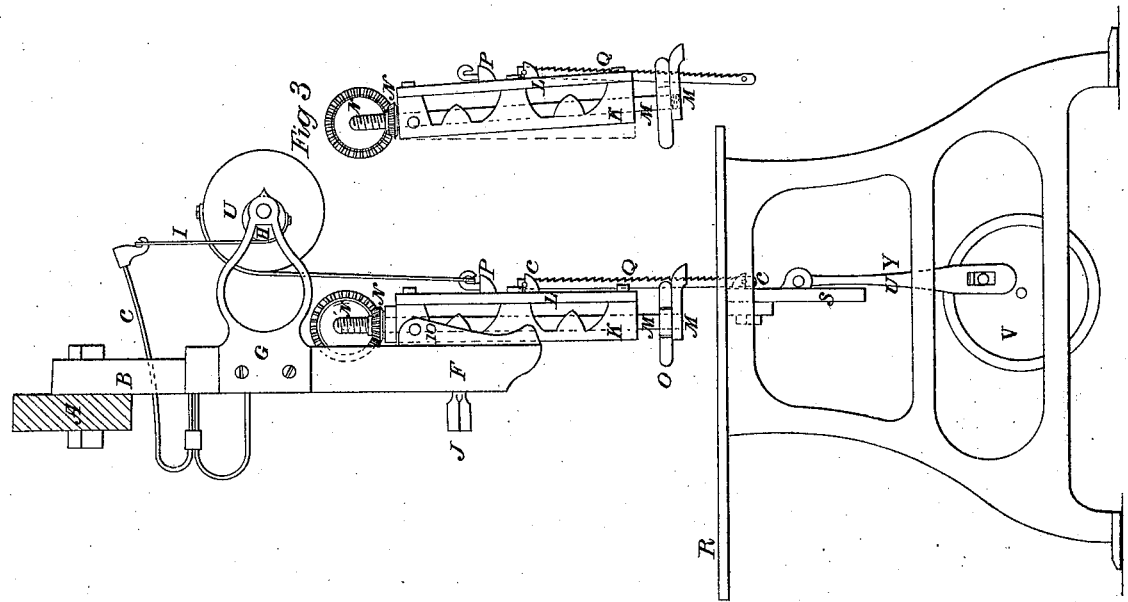

LYSANDER WRIGHT, OF NEWARK, NEW JERSEY.

SAWING-MACHINE.

Specification of Letters Patent No. 12,176, dated January 2, 1855.

*To all whom it may concern:*

Be it known that I, LYSANDER WRIGHT, of the city of Newark, in the county of Essex and State of New Jersey, have invented a new and Improved Mode of Hanging, Straining, and Operating Saws; and I do hereby declare that the following is a full and exact description thereof, reference being had to the accompanying drawings and to the letters of reference marked thereon.

The nature of the invention consists in so arranging and combining mechanical devices, that a sufficient amount of strain is given to the saw by a spring or elasticity and allowing the saw to move through a given space required while the spring moves through a much less space thereby not overstraining the spring. Also of so arranging and combining a revolving guide block with a holdfast so that saws of any width shall be effectually guided in its passage through the timber. Also of so arranging and combining the spring and pulleys or pulley and eccentric cross head guides holdfast guide block shoe screws &c. for the purpose of raising and falling the slides and gate for different length of saws without altering the arrangements of the spring &c. and for giving a rake to the saw.

To enable others skilled in the art to make and use my invention I will proceed to describe its construction and operation.

Figure 1 of the annexed drawings is a side elevation of the machine. Fig. 2 is a front view of the same. Fig. 3 is a side view of the slides, shoe holdfast and gears, crosshead, saw, and guide block showing the position of the slides and saw, when the saw is thrown on a rake. Fig. 4 is a side view of large pulley and one eccentric (other not seen) to which the spring and saw belts are attached. Fig. 5 is a top view of the revolving guide block showing different depths of slots for different widths of saws. Fig. 6 is a side view of the large and one small pulley (other not seen) to which the spring belts can be attached in lieu of the eccentric.

In Fig. 1 letter A is the flooring timber or cross beam. B is an upright post bolted onto the flooring timber to which the whole upper works are firmly fastened. C the spring on the outer end of which is two hooks to which is suspended belts or straps II. The lower end of these belts are fastened to two small eccentrics at D or pulleys at E in Fig. 6. F is an iron support to which the whole improvement is attached. G is one of the arms that support the axle of the pulley U and eccentric H. IO is the shoe at the upper end of which the bed slides, &c., are hung on pivots. This shoe is also raised and lowered together with its fixtures by a screw at J playing into a slot at the back of the machine. K is the bed to which the slides L are fastened. MM is the holdfast and rod. NN are the gears that raise and lower the holdfast and rod by means of a screw cut on the top of the rod working through the lower gear in which is cut a corresponding screw.

O is the guide block as at Fig. 5; P, upper cross head; Q, saw; R, table; S, lower cross head guides; T, lower cross head; UY, pitman; V, balance wheeel; W, pulley for power; X, shaft.

In Fig. 2 letter A′ is a screw for regulating the rake of the saw. B, B are slots cut into the cross head to receive the saw Q.

At Fig. 1, c c are the pins in the saw to keep it in place when strained. D′ is the crank pin in the balance wheel. E is a hand wheel for turning the gears N N at Fig. 1 and 3. X is driving shaft to which the power is communicated at pulley W, Fig. 1.

Having described my invention, its operation is as follows: The reciprocating motion is given to the saw by power applied at the pulley W at Fig. 2, turning shaft X and balance wheel V causing crank pin D to make a revolution carrying with it pitman UY, thus causing the upper end of the pitman and lower cross head to play up and down, the cross head being confined to guides S. S. The upper and lower cross heads are connected together by the saw. The upper cross head is attached to the spring C by the belts or straps II at Fig. 1 or pulleys varying in size Fig. 6. The design of these pulleys and eccentrics or pulleys varying in size, is that a sufficient amount of strain may be given to the saw by a spring and allow the saw to pass through a given space while the spring moves through a much smaller one thereby not overstraining it. This is accomplished by the difference in the periphery of the wheel and eccentric or two pulleys varying in size, by the winding and unwinding of the belts II or on and off the pulleys, at Fig. 6, thus with every turn of the balance wheel giving the saw a reciprocating motion. The rake is given to the saw by throwing forward the lower end of the bed K and slides L which are suspended at their upped ends by pivots through the shoe I, O and held in any position wanted by the screw A at Fig. 2. The raising and lowering of the shoe, bed, guides, cross head, &c., for different lengths of saws is accomplished by means of screw J that is screwed into the shoe I, O and plays up and down through a slot in the iron support F and held firmly in position wanted by means of Screw J.

The stuff is held down to the table by the holdfast and rod M M which is operated by the hand wheel E and gears N, N.

The guide block O is turned to receive any width saws, on its axis on the lower end of the rod M and held by a screw in its periphery. This guide block is placed on its axis by unscrewing the holdfast M.

Having thus fully described my invention what I claim as my improvement, and desire to secure by letters patent is—

1. I claim the two pulleys varying in size for the purpose set forth.

2. I also claim the revolving guide block for the purposes set forth.

3. I also claim the arrangement and combination of the guides, cross head, holdfast, and guide block, shoe, and screw for the purpose of raising and lowering and to give the rake all of which substantially as set forth.

LYSANDER WRIGHT.

Witnesses:
STEPHEN CLARKE,
WILLIAM C. HUNTINGTON.